US012236775B2

(12) United States Patent
Lewis

(10) Patent No.: US 12,236,775 B2
(45) Date of Patent: Feb. 25, 2025

(54) SAFETY CORRIDOR ARRANGEMENT

(71) Applicant: Mitchell Lee Lewis, North Ward (AU)

(72) Inventor: Mitchell Lee Lewis, North Ward (AU)

( * ) Notice: Subject to any disclaimer, the term of this patent is extended or adjusted under 35 U.S.C. 154(b) by 138 days.

(21) Appl. No.: 17/790,683

(22) PCT Filed: Jan. 5, 2021

(86) PCT No.: PCT/AU2021/050002
§ 371 (c)(1),
(2) Date: Jul. 1, 2022

(87) PCT Pub. No.: WO2021/134117
PCT Pub. Date: Jul. 8, 2021

(65) Prior Publication Data

US 2023/0055364 A1 Feb. 23, 2023

(30) Foreign Application Priority Data

Jan. 5, 2020 (AU) ................................ 2020900014

(51) Int. Cl.
*G08B 7/06* (2006.01)

(52) U.S. Cl.
CPC ............. *G08B 7/066* (2013.01); *G08B 7/062* (2013.01)

(58) Field of Classification Search
CPC .......... G08B 7/066; G08B 7/062; G08B 1/08; G08B 17/10; G08B 19/00; G08B 3/00; G08B 5/38; G08B 21/02; F21S 9/024; F21Y 2115/10; F21Y 2115/30; F21V 33/0076; G09F 2019/225; G09F 19/18; G09F 19/22; G09F 27/005; G09F 27/004; H04W 4/90
See application file for complete search history.

(56) References Cited

U.S. PATENT DOCUMENTS

| | | | | | |
|---|---|---|---|---|---|
| 4,074,225 | A * | 2/1978 | Vandeweghe | A62B 3/00 | 340/584 |
| 4,385,586 | A * | 5/1983 | Schriever | G09F 3/00 | 340/407.1 |
| 4,489,308 | A * | 12/1984 | Logan, Jr. | G08B 7/062 | 242/390.8 |
| 4,531,114 | A * | 7/1985 | Topol | A62B 3/00 | 340/533 |

(Continued)

OTHER PUBLICATIONS

International Search Report in corresponding PCT application No. PCT/AU2021/050002, March, 5, 2021, 4 pp.

(Continued)

*Primary Examiner* — Curtis J King
(74) *Attorney, Agent, or Firm* — Tredecim LLC; Sean L. Sweeney

(57) ABSTRACT

The invention relates to a safety corridor arrangement for use in emergency situations, including an activation means, an operation means, associated with an activation centre, and a safety corridor suitable to guide or direct a person on a particular pathway. The activation centre, through activation of the activation means can cause operation of the operation means, and the operation means creates the safety corridor to guide a person along the safety corridor towards an exit. The invention also relates to a point of exit arrangement, and methods of use.

11 Claims, 6 Drawing Sheets

(56) References Cited

U.S. PATENT DOCUMENTS

| | | | | | |
|---|---|---|---|---|---|
| 4,649,376 | A * | 3/1987 | Frank | G08B 17/113 | 174/101 |
| 4,737,764 | A * | 4/1988 | Harrison | E01F 9/559 | 40/550 |
| 4,754,266 | A * | 6/1988 | Shand | A62B 3/00 | 340/521 |
| 4,801,928 | A * | 1/1989 | Minter | A62B 3/00 | 362/147 |
| 5,130,909 | A * | 7/1992 | Gross | F21S 8/032 | 362/241 |
| 5,140,301 | A * | 8/1992 | Watanabe | G08B 7/062 | 362/147 |
| 5,724,910 | A * | 3/1998 | Annesley | G09F 13/20 | 116/202 |
| 5,775,016 | A * | 7/1998 | Chien | G09F 19/22 | 362/570 |
| 5,815,068 | A * | 9/1998 | Vadseth | G08B 7/066 | 340/815.4 |
| 6,025,773 | A * | 2/2000 | Bresnan | G08B 6/00 | 340/407.1 |
| 6,150,943 | A * | 11/2000 | Lehman | G08B 7/062 | 340/332 |
| 6,181,251 | B1 * | 1/2001 | Kelly | G08B 17/00 | 362/147 |
| 6,237,266 | B1 * | 5/2001 | Tassey | G09F 19/22 | 362/153 |
| 6,249,221 | B1 * | 6/2001 | Reed | G08B 1/08 | 340/331 |
| 6,313,549 | B1 * | 11/2001 | Moisan | G08B 7/066 | 307/66 |
| 6,472,994 | B1 * | 10/2002 | Tator | F21S 9/022 | 340/332 |
| 6,499,421 | B1 * | 12/2002 | Honigsbaum | G09F 19/22 | 52/33 |
| 6,646,545 | B2 * | 11/2003 | Bligh | G08B 7/062 | 340/332 |
| 6,778,071 | B2 * | 8/2004 | Megerle | G08B 7/062 | 340/8.1 |
| 6,785,992 | B2 * | 9/2004 | Chiarucci | G09F 19/22 | 40/616 |
| 6,854,163 | B1 * | 2/2005 | Ruana | B60N 3/02 | 116/1 |
| 6,896,388 | B2 * | 5/2005 | George | G08B 7/066 | 362/276 |
| 6,994,452 | B2 * | 2/2006 | Rozenberg | H05B 35/00 | 362/249.05 |
| 6,998,960 | B2 * | 2/2006 | Buschmann | G08B 7/066 | 340/525 |
| 7,232,236 | B2 * | 6/2007 | Vitense | G09F 19/22 | 40/560 |
| 7,255,454 | B2 * | 8/2007 | Peterson | F21S 8/032 | 362/147 |
| 7,271,739 | B2 * | 9/2007 | Higelin | G09F 19/22 | 340/925 |
| 7,626,507 | B2 * | 12/2009 | LaCasse | G08B 29/188 | 340/577 |
| 7,800,511 | B1 * | 9/2010 | Hutchison | G08B 7/066 | 340/3.1 |
| 8,083,367 | B2 * | 12/2011 | Anderson | F21S 8/032 | 362/217.1 |
| 8,319,367 | B2 * | 11/2012 | Liao | A62C 35/605 | 290/43 |
| 9,576,459 | B2 * | 2/2017 | Park | G08B 7/066 | |
| 9,685,051 | B2 * | 6/2017 | Turner | G08B 7/066 | |
| 9,852,394 | B1 * | 12/2017 | Rouaix | B65G 1/1373 | |
| 10,345,686 | B2 * | 7/2019 | Muramatsu | H04N 23/69 | |
| 10,669,740 | B2 * | 6/2020 | Szerszen | G08B 7/062 | |
| 10,679,480 | B2 * | 6/2020 | Eckert | G08B 5/36 | |
| 10,769,902 | B1 * | 9/2020 | Kronz | G08B 7/062 | |
| 10,802,665 | B2 * | 10/2020 | Proctor | G09F 19/18 | |
| 10,872,510 | B2 * | 12/2020 | Derickson | G08B 7/062 | |
| 11,037,416 | B2 * | 6/2021 | Mundra | H05B 47/105 | |
| 11,189,141 | B2 * | 11/2021 | Armpriester | H04W 4/90 | |
| 11,390,392 | B2 * | 7/2022 | Jurlina | B64D 25/14 | |
| 2002/0057204 | A1 * | 5/2002 | Bligh | G09F 3/00 | 340/691.1 |
| 2003/0189823 | A1 * | 10/2003 | George | F21S 4/24 | 362/147 |
| 2003/0217494 | A1 * | 11/2003 | Chiarucci | G09F 19/22 | 40/584 |
| 2003/0234725 | A1 * | 12/2003 | Lemelson | G08B 7/066 | 340/521 |
| 2004/0075572 | A1 * | 4/2004 | Buschmann | G08B 7/062 | 340/691.1 |
| 2005/0073405 | A1 * | 4/2005 | Spoltore | G08B 7/066 | 340/506 |
| 2005/0174251 | A1 * | 8/2005 | Terry, III | G08B 7/062 | 340/506 |
| 2005/0286247 | A1 * | 12/2005 | Peterson | G08B 7/066 | 362/153 |
| 2006/0077069 | A1 * | 4/2006 | Kontovich | G08B 7/066 | 340/815.87 |
| 2007/0152808 | A1 * | 7/2007 | LaCasse | G08B 29/188 | 340/577 |
| 2007/0171089 | A1 * | 7/2007 | Small | G08B 7/066 | 340/506 |
| 2008/0007400 | A1 * | 1/2008 | Murphy | G09F 19/18 | 340/332 |
| 2008/0266065 | A1 * | 10/2008 | Kennedy | G08B 7/062 | 340/332 |
| 2008/0266121 | A1 * | 10/2008 | Ellul | G08B 7/066 | 340/584 |
| 2008/0282961 | A1 * | 11/2008 | Halberg | G08B 6/00 | 116/205 |
| 2009/0151210 | A1 * | 6/2009 | Nagatome | G09F 19/22 | 40/541 |
| 2010/0013658 | A1 * | 1/2010 | Chen | G08B 7/062 | 340/815.45 |
| 2010/0019901 | A1 * | 1/2010 | Tsai | G08B 7/066 | 340/693.2 |
| 2010/0039793 | A1 * | 2/2010 | Chen | F21V 21/30 | 362/20 |
| 2010/0188023 | A1 * | 7/2010 | Anderson | F21S 8/032 | 315/312 |
| 2011/0007280 | A1 * | 1/2011 | Patterson | G08B 7/066 | 340/584 |
| 2011/0089869 | A1 * | 4/2011 | Sundholm | H05B 45/10 | 315/323 |
| 2011/0121654 | A1 * | 5/2011 | Recker | H05B 45/3725 | 307/64 |
| 2011/0157486 | A1 * | 6/2011 | Murata | H04N 9/3188 | 353/11 |
| 2011/0267179 | A1 * | 11/2011 | Patterson | G08B 7/066 | 340/286.02 |
| 2012/0038479 | A1 * | 2/2012 | Ten Wolde | F21V 23/0471 | 340/540 |
| 2012/0176776 | A1 * | 7/2012 | Van Herpen | E04F 13/074 | 362/147 |
| 2012/0181934 | A1 * | 7/2012 | Knibbe | H05B 47/125 | 315/153 |
| 2014/0139539 | A1 * | 5/2014 | Byers | G08B 7/062 | 345/589 |
| 2014/0331533 | A1 * | 11/2014 | Hasan | G09F 13/0445 | 40/570 |
| 2015/0287295 | A1 * | 10/2015 | Trivelpiece | G01S 5/0294 | |
| 2015/0348220 | A1 * | 12/2015 | Sharma | G01C 21/3407 | 705/324 |
| 2016/0003428 | A1 * | 1/2016 | Anderson | F21S 4/26 | 362/147 |
| 2016/0007179 | A1 * | 1/2016 | Kim | G08B 7/066 | 455/404.1 |
| 2016/0027266 | A1 * | 1/2016 | McDonagh | G08B 7/062 | 340/815.4 |
| 2016/0042615 | A1 * | 2/2016 | Turner | G08B 7/066 | 340/815.66 |
| 2016/0275761 | A1 | 9/2016 | Tanaka et al. | | |
| 2017/0018154 | A1 * | 1/2017 | Wen | G08B 27/001 | |
| 2018/0050226 | A1 * | 2/2018 | Park | G09F 27/00 | |

(56) References Cited

U.S. PATENT DOCUMENTS

| | | | | |
|---|---|---|---|---|
| 2019/0295207 | A1* | 9/2019 | Day | G08B 5/38 |
| 2019/0295386 | A1* | 9/2019 | Roberts | G08B 7/062 |
| 2019/0295397 | A1* | 9/2019 | Eckert | G08B 5/36 |
| 2020/0018093 | A1* | 1/2020 | Szerszen | E05B 65/1066 |
| 2020/0349827 | A1* | 11/2020 | Joshi | G08B 27/006 |
| 2020/0352008 | A1* | 11/2020 | Chan | H05B 47/115 |
| 2021/0142630 | A1* | 5/2021 | Carballido Villaverde | G08B 17/00 |
| 2021/0322806 | A1* | 10/2021 | Fernandez-Orellana | G08B 17/10 |

OTHER PUBLICATIONS

Written Opinion in corresponding PCT application No. PCT/AU2021/050002, Dec. 9, 2021, 5 pp.

International Preliminary Report on Patentability in corresponding PCT application No. PCT/AU2021/050002, Apr. 29, 2022, 11 pp.

* cited by examiner

SAFETY CORRIDOR ARRANGEMENT

The present invention relates to a safety corridor arrangement, and in particular to safety corridor arrangement to direct people to safety in case of emergency.

BACKGROUND TO THE INVENTION

Fire is an extremely dangerous and frightening emergency. Smoke quickly fills a room and reduces the visibility to very low. A person will be disorientated, and in a state of stress and shock, and with the reduced visibility may struggle to find their way out of the room, out of the building and towards safety. Current fire alarms can detect smoke and alert the occupants to the fire, however, fire can spread very quickly and the smoke may already be thick before a person has started to try to leave the building. It is likely that the power is off and no additional light is available, fires often occurring at night when the occupants are asleep. In this case a person may be choking on smoke, and in the dark trying to locate a doorway, and the way out of the building.

A similar problem was identified in emergency situations for planes, and since notable incidences, it is now compulsory to have floor lighting to light the way to the exit along an aisle. In a cinema, similar floor lighting may light the aisle. However, these lights rely on being lit all the time, which is not a suitable solution for a domestic home, or many situations. Further, the aisle lights only go so far to direct a person along an aisle. In the case of the cinema, often the exit itself is a distant corner and in the absolute dark and is not easily seen. The subject invention has developed a means to create a virtual corridor to light the way in the case of an emergency to direct a person to a doorway, and ultimately out of the building. This versatile and multi-faceted invention enables a safety corridor using laser light to be created to lead a person out of the building, which can also be used to advise people of where the safety exits are located in times of safety and guide a person safely away from the fire in times of danger. Although designed with fire in mind, the safety corridor arrangement may be used in any case where it is desired to guide a person away from danger. This may include any time of poor visibility but also if there is gas, blizzard conditions, high winds, any climatic, man-made or natural condition where it would be of benefit to be able to be guided to safety. Further, light, sound and vibrations may all be used to guide along the safety corridor so that being able to see is not a requirement of use of the invention.

It is envisaged that other safety features will be included in the arrangement, for example, the safety corridor may be the location of firefighting equipment, water including hoses or drinking water, fire blankets, fire extinguishers, communication devices, anything of use during the emergency. Where the emergency is not fire there may be other suitable equipment positioned within the corridor and easily discerned once there, for use.

It is also envisaged that the safety arrangement will be adapted to be incorporated into a smoke detection system. The smoke detection system can be used to start the safety corridor arrangement, at first detection of smoke. In some forms of the invention, where there is a system of smoke detection, and a choice of safety corridors the occupants will be directed to the safest safety corridor and exit with least smoke being detected.

The inventor, has through long and careful development, invented a very clever new safety corridor arrangement which is likely to be a significant improvement for safety domestically and for commercial buildings. The invention may be conveniently be referred to as Laser Identified Fire Exit ("LIFE") for the ceiling mounted unit to provide initial direction of the exit, as well as the Point of Exit Audible Alarm ("PEAA") for the door mounted unit to highlight the point of exit. While each part LIFE and PEAA can work independently each as novel inventions, the combined invention provides a significant improvement over the art, and a significant safety improvement for use in the future. The combined safety systems provide a vertical laser direction system to the door, and a door mounted audible alarm to assist the person to find their way and leave the room and the danger. Further laser arrangements in the PEAA clearly illuminate the exit doorway, and assist to add to the laser corridor. In commercial applications a further laser to the ceiling can assist to find the exit, even if obscured by fallen goods or debris. The LIFE and PEAA systems together give an alarm, such as an audible directive and a visual indication of the direction of the exit. Together they provide a complete emergency corridor arrangement to direct the person all the way to the final exit, and to safety.

The following describes non-limiting examples of the invention being used with reference to a safety corridor arrangement for a fire in a commercial building such as a shop, or separately in a domestic setting, such as in family home. The invention is useful for any emergency and is not intended to be limited to fire, other than as limited in the claims. Further, the invention is useful to create a safety corridor in any kind of building or area and it is not intended to limit the invention, other than as limited in the claims. For example, in large commercial shopping precincts, cinemas, municipal buildings or tourist attractions use of the invention will be of particular use. The invention may also be used in outdoor arrangements such as industrially areas or loading bays.

For clarity, any prior art referred to herein, does not constitute an admission that the prior art forms part of the common general knowledge, in Australia or elsewhere.

It is an object of the present invention to provide a safety corridor arrangement that at least ameliorates one or more of the aforementioned problems of the prior art. It is a further object of the invention to provide a method of use of a safety corridor arrangement that at least ameliorates one or more of the aforementioned problems of the prior art.

SUMMARY OF THE INVENTION

Accordingly, the present invention provides a safety corridor arrangement for use in emergency situations, the safety corridor arrangement including:

an activation means;

an operation means, associated with an activation centre; and a safety corridor suitable to guide or direct a person on a particular pathway, wherein, the activation centre, through activation of the activation means may cause operation of the operation means, and the operation means creates the safety corridor to guide a person along the safety corridor towards an exit.

Preferably, the safety corridor arrangement dramatically improves the ability of a person to find an exit. Preferably, the safety corridor arrangement helps a person move away from the emergency, towards an exit. Preferably, the safety corridor arrangement significantly shortens the time taken by a person to find an exit. Preferably, a person is rapidly guided by the safety corridor to a fire exit or the like, to speed the person away from the emergency.

The emergency may be a fire. The emergency may be any emergency where use of the arrangement may be helpful. Some aspects of the invention may be used independently, for example to make public announcements, even when the safety corridor itself does not need to be activated. The emergency may, for example, include building collapse; earthquake; explosion; fire; flood; gas; terrorist attack; tsunami; war damage; or any combination thereof. The emergency may include poor visibility for any reason. The emergency may include smoke, gas, contaminants, or dust, for example. The emergency may include the conditions of very poor visibility reducing ability to find an exit or doorway.

The activation means may take any suitable form. The activation means may include a smoke detector. The smoke detector may detect smoke in any suitable manner. The smoke detector may be a linked system of smoke detectors whereby activation through smoke detection at one smoke detector, will cause activation of the other smoke detectors linked thereto. Areas or systems of smoke detectors may be included in a building such as a large commercial building, whereby sectors of smoked detectors are activated by one smoke detector detecting smoke. Many variants to the activation means including a smoke detector may be used to suit the particular application. The activation means may be activated by one or more smoke detector where the emergency includes smoke. Where the emergency does not include fire, other detectors can be included. These other detectors may include: chemicals in the air; dust; ground movement; temperature; oxygen levels; sound levels; water or moisture levels; or any other indicator of an emergency requiring rapid exit.

In a preferred form of the invention, the activation means is at a separate location to the rest of the safety corridor arrangement, for example a smoke detector in one part of the building may activate the safety corridor arrangement elsewhere to direct people to the fire exit. The activation means in any of its forms may be installed remote to the fire exit, and to the rest of the safety corridor arrangement. The activation means can be any suitable way that can be caused to detect an emergency and then cause activation of the rest of the safety corridor arrangement. For example, the activation means may include a sound detector. The sound detector may be configured to detect particular noises or noises over a certain loudness to activate the safety corridor arrangement. Where a particular noise is detected this may be an explosion or smashing glass, or any type of noise associated with an emergency. The detection may include a decibel detector, to detect noise over a certain level in decibels. Preferably, a sound detector is included as an activation means and noise levels over 110 decibels will activate the safety corridor arrangement to guide a person towards an exit.

In some forms of the invention a manual over-ride or manual sound activator of the activation means may be included. Preferably, the activation means may be activated by a hand-held emergency horn, or other hand controlled sound alarm. Preferably, the activation by sound can be adjusted through increased or decreased sensitivity to suit the particular application. The activation system may be separate to the other parts of the system in some forms of the invention. Or the activation means may be incorporated with other parts of the system in some forms of the system. The activation means may be or include a means to be activated by a smoke detector. The activation may be due to the activation of the smoke detector in any manner, including through activation by the sound of the smoke detector being detected by the activation means to activate and operate of the safety corridor arrangement. In other words, there may be a direction activation when the smoke detector detects smoke through a linked system. In other forms, the sound itself is sufficient to activate safety corridor. It is particular useful to be able to activate the system using an external system either automatically in response to damage to the building causing a loud noise, manually through use of a hand-held horn, or through an automated or manual loud alarm sound operable in times of emergency.

A wireless network may be included, whereby the wireless network or arrangement communicates with the other parts of the safety corridor arrangement. The wireless connectivity of the safety corridor arrangement may be used for communication of any parts of the arrangement. Wireless monitoring and or control is preferably included to monitor the activation means, activation control and parts of the arrangement that are in operation. The monitoring may be undertaken remotely. The control of the arrangement may be able to be undertaken remotely, useful when the area of the building containing the safety corridor arrangement is on fire, or otherwise suffering an emergency.

Preferably, on activation of the activation means the operation means creates the safety corridor. In other words, once the emergency is detected by the activation means the activation control is caused to operate the safety corridor to direct people to an exit. Manual override control may be included for any of the features, for added control. The safety corridor may form part of another safety system for a building. Preferably, a plurality of safety corridor arrangements are included to direct a person from where they are in the building, through doorways and exits until they pass through an exit to the outside and safety. In some cases a single safety corridor arrangement is sufficient to direct a person from the room where they are to the fire exit, which leads to the outside. In other domestic arrangements, several doorways will need to be passed through before the final exit to the outside is found. In this arrangement multiple safety corridors will need to be found and followed to take you through the necessary doorways to pass to the door to the outside. In commercial arrangements, such as in an office block or shopping centre, there will be multiple corridors necessary to assist to direct all the people in the many rooms and areas through the doorways and fire exits to lead to the outside. In some arrangements the safety corridors may lead to a muster station (such as when used on a ship) or to another safe area where people may gather before rescue.

The operation means may take any suitable means to cause the safety corridor to be operated with one or more alarms as suitable. Where a wireless network is included the operation means and the activation centre may be in wireless communication. The activation means may likewise be in wireless communication with the activation centre. The operation means may include any one or more of: visual; audible; physical; or other alerts to an emergency. The alerts may be direct or indirect through further devices. The alerts may be chosen from the following group: audible alarms; displays including words or symbols; flashing lights; lights; loud sirens; shaking devices; and vibrations.

Preferably, the operation means is connected wirelessly to other parts of the safety arrangement. Preferably, the operation means is connected wirelessly to other parts of other safety equipment. The wireless communication may be through mobile networks, WIFI (Trade Mark), BLUETOOTH (Trade Mark) or any similar system or combination of systems. Preferably, an alert may be communicated to and or on from the activation and or operation means through use of wireless communication. A remote control may be used to control and operate the arrangement.

Preferably, a plurality of controls are included which on operation create a visual corridor to guide a person to a doorway, exit or other place of safety. Preferably, one or more laser light is included to define a corridor. Preferably, multiple planes are created to define a corridor. Preferably, multiple horizontal planes are included and created to define a corridor. Horizontal and or vertical planes may be used to create the virtual safety corridor. Preferably, lasers are used similar to those used in the entertainment industry. These may be green lasers, as are frequently used or any suitable laser, safe for the application. Any suitable light or laser may be used to create the corridor. Preferably, lasers connect to other parts of the system to illuminate doorways, for example to make the doorways and exits particularly easy to see, even in times of poor visibility. Optionally, plastic tubes or similar may be used to convey the laser light, in some forms of the invention. The form of laser light used is preferably similar to those used in the entertainment industry by DJs to project a light beam, often to create an aesthetic effect; these are also used in night clubs and shows. This form of lasers are a safe, low cost laser, than can be turned on and easily and when turned off are unobtrusive. Laser lights such as those sold for DJs, SUNY DM-RGY200 may be suitable, or those used for laser stage lighting, being easy to use, and manipulate. For example 8 CH DMX 512 Pro Scanner DJ Party KTV Show Projector Equipment Light or another suitable laser is the Beamz Cupid Double Multipoint laser with 12 GOBO pattern which projects multiple beams to the wall and ceiling. Other similar suitable lasers may be used instead. The speakers included to make the safety announcements and or sound the alarm may be any suitable speakers. Preferably, waterproof speakers are used. Preferably, a plurality of speakers are used in the system. LENOXX IP X& waterproof Bluetooth speakers are also a useful example. Preferably, the speakers are waterproof speakers. Preferably, the waterproof speakers are suitable to work in sprinklers or other emergency water situations.

Preferably, walls are defined of the corridor. The walls may be defined by a sheet of laser in the vertical plane, or through multiple horizontal plane lasers, ending at the same point to define a wall. Preferably, a ceiling is defined by the corridor. The ceiling may be defined by a sheet of laser in the horizontal plane, or through multiple vertical plane lasers, ending at the same point to define a ceiling. Preferably, a floor is defined. The floor may be defined by a sheet of laser in the vertical plane, or through multiple horizontal plane lasers, ending at the same point to define a floor. Most preferably, used of fanned out lasers mean that as a person moves forward towards an exit they can see the laser on their hands, body or feet to help direct them to an exit. Preferably, a corridor is defined sufficient to guide or direct a person from one location to another. Any one or more of floor, left side wall, right side wall or ceiling of the virtual corridor can be used to direct a person towards an exit. Most preferably, all of floor, left side wall, right side wall and ceiling are at least to some extent defined to assist to direct a person to an exit. The defining may a single line of lights or laser. The defining may be a diffuse fanned light to create a side of the corridor. Fanned out lasers may be used in the horizontal plane to define multiple parts of the corridor. For example, just above the floor to define a floor, or likewise a ceiling. The orientation of the lasers and diffused laser light may be altered to suit the particular application.

Preferably, the corridor is invisible when not in use. Preferably, the area of the corridor is given additional fire proofing or safety. Preferably, useful items in case of fire are accessible from the corridor. For example, oxygen masks, water, safety items or a fire extinguisher. Any useful equipment for dealing with the emergency may be included close to the safety corridor for ready access in an emergency.

Preferably, a virtual corridor is created in response to emergency activation to direct a person from one location to another with guidance to do so in the case of an emergency.

Preferably, there is at least one laser to define a corridor towards an exit doorway. Preferably, a plurality of lasers may be included. Preferably, a pair of lasers are included to define the corridor toward the exit doorway.

Preferably, a point of exit arrangement is included. Preferably, the point of exit arrangement includes a bar which may be fitted above the exit doorway. The bar may take any suitable form. The point of exit arrangement may be formed in parts, or arranged around any suitable part of the exit doorway, in other forms of the invention. Preferably, the bar is installed above the exit doorway. Preferably, the bar extends on either side of the door frame. Preferably, there is an EXIT sign above the exit doorway. The bar of the point of exit arrangement may include any one or more of lasers, speakers, lights and signs.

Preferably, the bar includes one or more Light Emitting Diode ("LED") panel, able to display messages through illuminating multiple LEDs. The messages may be emergency messages. The messages may be programmed from a local or central control to display suitable words. Or the messages may be a generic message "emergency exit". The messages may be in response to Alert system messages as is used in a particular country.

Preferably, one or more lights are included below the bar to assist illumination. Preferably, a strip of lights is included below the bar. A strip of lights may be included anywhere about the doorway. The doorway may be illuminated I any suitable manner.

Preferably, the point of exit arrangement includes an audible alarm. In inferior forms of the invention the point of exit arrangement may not include an audible alarm. Preferably, the point of exit arrangement includes one or more speakers. Preferably, the one or more speakers enables an audible alarm in times of emergency or fire. Any suitable number of speakers may be used. Preferably, the speakers are able to give out safety announcements. The speakers may be caused to give out any suitable safety message. The message may be programmed into the point of exit arrangement and activated directly from the control centre.

Preferably, the point of exit arrangement includes one or more lasers. Preferably, one or more lasers are included to create an illuminated doorway. Preferably, the illuminated doorway is an illuminated exit, to guide a person out of a room. The lasers may illuminate any one or more part or edge of the doorway. There may be lasers to illuminate vertically. There may be lasers to illuminate horizontally. There may be lasers to illuminate in a diffuse or fanned form to give a spread of the light. The fanned or diffuse laser light gives the effect of a side wall of the safety corridor. Horizontal or vertical laser beams may be used as appropriate. Lasers may be used at either end of the corridor to give overlapping lasers to give the effect of a side wall to the corridor from either end.

Preferably, the point of exit arrangement includes a laser directed at the floor to illuminate below the laser. Preferably, there are a pair of down pointed lasers, each in the generally area of the left and right sides of the door frame, to illuminate the left and right sides of the door frame. Any number of down pointing lasers may be used. The lasers may be any suitable angle, as appropriate to illuminate the doorway or exit. Preferably, the down pointing lasers are directed to deflect the laser light in a horizontal plane, fanning out above the floor. The fanning out may create a virtual floor. The deflected and fanning out laser may be repeated at any height. The fanning out laser may be useful as the laser from an exit direction can be seen on a person, so they know they are heading in the right direction. The deflection may be 45 degrees. Any suitable angle may be used to deflect or disperse the laser. The angle may be any suitable angle for any of the deflections. The laser light from the down pointing lasers may be directed along plastic tubing to form edges. The laser light from the down pointed lasers preferably is deflected to fan out to illuminate and assist to form part of the side of the safety corridor. Preferably, the laser angles are adjusted to create the appropriate laser for the corridor. Preferably, one or more lasers is included angled to create a deflected or fanned out laser light. The deflection may be at 45 degrees. The deflection may be suitable to create a "wall" of the corridor. Any suitable arrangement may be used.

Preferably, one or more deflector is included below the down pointed lasers. Preferably, a pair of down pointed lasers are included and a pair of angled lasers each pair with one on either side of the doorway.

In commercial applications upward pointing lasers may be included, directed to a roof or ceiling. The upward laser may assist the exit to be seen from far away.

Preferably, the point of exit arrangement assists by illuminating the exit clearly. Most preferably, use of the safety corridor arrangement with point of exit arrangement to provide a strongly illuminated corridor to direct people to the doorway and exits. Several corridors may be used to direct through a plurality of doorways to the ultimate exit.

Accordingly, the invention also provides a method of use of a safety corridor arrangement, the safety corridor arrangement including an activation means and an operation means able to generate a safety corridor in an emergency to guide or direct a person in a direction, the method including the following steps: — a) activation of the activation means in the case of an emergency;
b) operation of the operation means on activation to create a virtual corridor; and
c) directing a person to take the corridor as a safe path.

The safety corridor arrangement of the method may be the safety corridor arrangement of the invention in any of its forms or variants. The safety corridor arrangement may include a point of exit arrangement, according to any of its variants.

BRIEF DESCRIPTION OF THE DRAWINGS

The invention will now be described in connection with non-limiting preferred embodiments with reference to the accompanying drawings, in which.

DETAILED DESCRIPTION OF THE DRAWINGS INCLUDING A BEST METHOD

Figure 1:
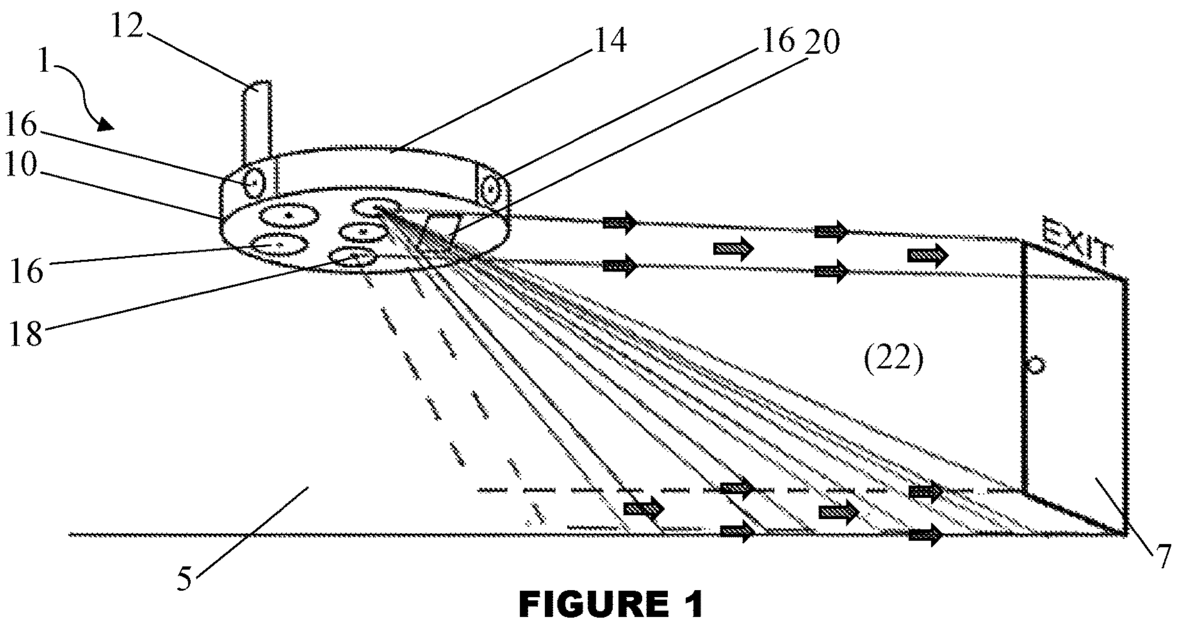
FIG. 1 is a perspective schematic side view of a safety corridor arrangement according to a first preferred embodiment of the invention for use in a commercial property, a shop.

Referring to FIG. 1 a first preferred embodiment of the invention will be described, where safety corridor arrangement 1, is installed in room 5 including exit 7, a door in a doorway with EXIT written above in accordance with safety requirements. Room 5 is a commercial property room, and as illustrated is a windowless shop in a large shopping centre. As would be understood in normal circumstances shops are well lit and easy to move around, however, in an emergency the light levels are very low. When the emergency is fire the low light and smoke make it very difficult to see, or to locate an exit, and the safest routeway from the fire. Room 5 is shown with a ceiling, walls and floor (none of which are labelled) in the usual manner, and safety corridor arrangement 1 is installed in the ceiling and floor in the main. Laser operation unit 10 contains most of the parts of safety corridor arrangement 1, and is usefully installed in the ceiling of room 5.

Ceiling smoke detector 12 will give early detection of a fire, through detection of smoke and cause operation of the safety corridor as described below. Smoke detectors generally are installed at very regular intervals throughout a building and detect smoke in a room. Generally, these smoke detectors communicate wirelessly to extend the alarm from one to another. Additional smoke detectors can be included in the system, and these may communicate that there is smoke and set of the safety corridor in other forms of the invention. Any suitable detection system can be incorporated into the invention.

On detection of smoke by ceiling smoke detector 12, or otherwise, LED notification panels 14 becomes illuminated to display an alert. These panels are repeated around the generally circular laser operation unit. The display gives the visual alert which can be seen in all directions from any point in the room.

Generally, the alert will say "FIRE-Evacuate" or similar emergency message to alert people to the danger and ask them to leave. The LED panel is of a known form, with a plurality of LEDs that can be pre-programmed to display messages or programmed directly at the time of an event. The elevated position of LED display 14 is useful to give a clear message to the occupants of the room that can be seen right across the room.

On activation, the visual alert, LED panel 14 is lit for the duration of the emergency event, and at the same time an audible alert sounds from speakers and alarms 16. Throughout waterproof BLUETOOTH (Trade Mark) speakers are used, for example LENOXX IP wireless linked. There are three of these at the rear as illustrated and one at the front. It is useful to include multiple speakers so the sounds and alerts are directed in all directions at the same time. Speakers 16 give an alarm sound, a standard siren to alert all that an emergency is taking place. Usefully, speakers 16 can also be used to give any audible alarm. Pre-programmed audible sounds will be included, to talk to the occupants and assist them to calmly and safely find the exit and get out of the building. The audible message can be made specific to the particular room with clear directions on what a person should do to get out safely. Optionally, the message can be varied for particular situations and a message programmed in at the time of the event. Remote control is preferably, to set up the arrangement before use. A familiar voice, a manager or senior staff member can be used to keep people calm with giving a clear, authoritative message to direct them to quickly get out.

Most importantly, in addition to the visual and audible alarms and messages, on activation laser lights 18 are activated and operated from laser operation unit 10. As shown each laser light 18 (3 units illustrated) generates the safety corridor, in response to the activation from smoke detector 12. The lasers used for the system are waterproof, lightweight easy to use lasers such as used by DJs or in the entertainment industry. For example SUNY DM-RGY200 laser stage lighting, 8 CH DMX 512 Pro Scanner DJ Party KTV Show Projector Equipment Light, or Beamz Cupid Double Multipoint laser with 12 GOBO pattern which projects multiple beams to the wall and ceiling. Through wireless connector 20, which includes WIFI (Trade Mark) and BLUETOOTH (Trade Mark) connectors other emergency detectors can also cause activation of the operation unit 10. It is also through wire connector 20 that remote control and communication of operation unit 10 is achieved in the usual manner.

The laser lights 18 are a standard form, as used for aligning vehicles or in the construction industry, Green lasers used to create a visual corridor, that a person can see and follow to safety. Multiple lasers are used to direct the Green lasers in lots of directions to draw lines through the smoke filled rooms. As shown plastic rods can carry the laser light when the laser light is directed at them, such as around the doorway. In this way the doorway is strongly illuminated by the lasers a clear indication of where a person is to head to leave the room.

Safety corridor 22 is created like a standard corridor but with walls formed of light, through multiple horizontal laser beams stacked on top of one another. Any angle or horizontal and or vertical lasers can be used to create the corridor arrangement. Safety corridor 22 defines a safe path or route from operation unit 10 towards an exit or doorway 7. There will be multiple operation units 10 in a building to make up arrangement 1, so that a whole building will have the safety arrangement installed. Each doorway may lead direct to the outside, or may lead to another arrangement to lead to another corridor, each leading to another corridor until ultimately, the person is directed to safety. The whole commercial complex should be fitted with the arrangement to enable full safety direction.

Safety corridor 22 as shown is formed of many laser beams in each plane. First laser beams are fired from laser lights 18, in a straight line, straight at the top of door 7. Usefully laser light 18 can feed into plastic strips to light up doorway 7. Mostly Green lasers as a safe laser used in the entertainment industry are used. In addition, projected images are projected from laser lights 8, to project arrows to show very clearly the direction a person should travel. As shown arrows are included along the upper lasers, these form a virtual ceiling to corridor 22 with clear arrows to show in which direction a person should travel. If you are inside corridor 22, even if visibility is very poor looking up will enable you to see an arrow, and the direction to travel to try to leave the room.

Further multiple lasers are directed downwards at points on the floor one in front of the other so the laser light effect creates a virtual wall. The virtual wall can be readily seen and followed. Further arrows are generated and projected along the floor of safety corridor 22.

Safety corridor 22, has a virtual ceiling two walls and the floor all bathed in green laser light to clearly define. It is also possible to do so with only 1 to or 3 of these planes defined. The arrows are very useful but could be omitted. Other visual features could be included to project useful information along safety corridor 22.

Although not shown, safety equipment can be kept along safety corridor 22 or directed therefrom. For example, oxygen masks may fall from the ceiling along the corridor. Or water may be available or fire extinguishers, either in corridor 22, or just to a side to the corridor.

Beneficially, additional safety precautions such as use of fire proofing can be used along corridor 22 to maximise safety of the corridor during a fire.

In use, a fire will be detected through use of smoke detectors, and operation unit 10 is activated. Display panel 14 projects the message, speakers 16 give the alert and a message to evacuate, a laser lights 18 immediate lights corridor 22 in full.

Variants can be included for those who cannot see well, to include pillow shakers, and very loud noises, alert dogs, and audible messages for the person to tell them there is a fire and direct them to safety.

It is possible to use the system with other safety devices to detect the danger, to communicate the danger, or to assist to direct the person to safely. For example, safety lights can be included at the door or in other locations which illuminate in the emergency. It is a particular useful benefit of the invention that the safety corridor is created across a room, where usually such safety direction cannot be installed. Use of the lasers enable readily removable virtual corridor that can be created in the case of emergency.

Figure 2:
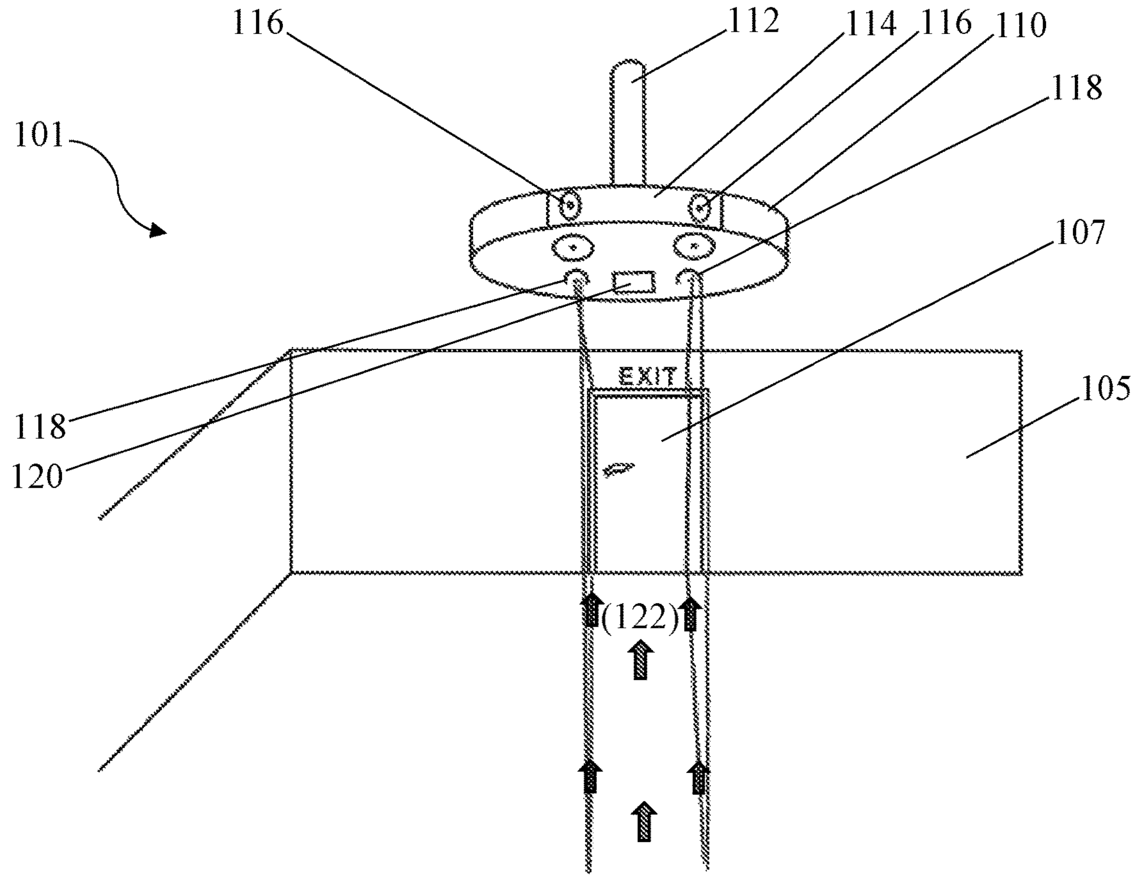
FIG. 2 a perspective schematic front view of a safety corridor arrangement according to a second preferred embodiment of the invention for use in a domestic home.

Referring to FIG. 2, a second preferred embodiment of the invention will be described, where safety corridor arrangement is described, using similar reference numerals to the first. The operation is the same but as described for a domestic arrangement, a bedroom for a child. A illustrated this time from the front, safety corridor arrangement 101, is installed in bedroom 105 including exit 107, a door in a doorway with EXIT written above.

One or more laser operation unit 110 is installed close to the ceiling with the operational parts of safety corridor arrangement 101, and is usefully installed in the ceiling of room 105 at a suitable location to direct a child from their bed to the doorway.

Ceiling smoke detector 112 is installed to detect smoke in the room, or if a communicated message from smoke in other parts of the building.

Again, on detection of smoke by ceiling smoke detector 112, or otherwise, LED notification panels 114 becomes illuminated to display an alert. For children this may include a special message including their name to assist them to understand what they need to do. The round form of the panels mean that the alert can be seen from any direction within the room.

On activation, the visual alert, LED panel 114 is lit for the duration of the emergency event, and at the same time an audible alert sounds from speakers and alarms 116. For the child, a familiar voice, usually a parent or guardian will calmly instruct them to get up and follow the corridor and out of the doorway. The laser light 118 and speaker arrangement 116, with wireless connector are all as described for the first embodiment.

Again, safety corridor 122 defines a safe path or route from operation unit 110 towards an exit or doorway 107. Arrows along the ceiling, floor and, if necessary, walls will be projected to assist to guide the child toward door 107.

In other forms of the invention the apparatus and methods of use may include features and instructions such as the following:

| DOMESTIC APPLICATION/MODEL |
| --- |
| 1: The current scenario for a normal smoke alarm... |
| Alarm is triggered.. |
| The immediate dangers are.... |
| A darkened smoke filled room.. |
| Hindering the location of the exit, |
| Panic sets in and often people perish even in their own home... |
| 2: The Scenario for the |
| "LIFE" Duel zone alarm.. |
| Alarm is triggered for smoke detected above or below the ceiling cavity. |
| The direction of Exit points are immediately identified and highlighted by single Green vertical Laser beam.. |
| A virtual corridor is also produced by the vertical Green laser.. |
| (A common Laser used builders) |
| A loud customised/prerecorded or generic default instruction is clearly given repeatedly... |
| "verbal instruction " |
| 1..(If pre recorded by a parent) |
| EVERYONE GET OUTSIDE NOW |
| Children respond quicker to a trusted familiar Voice... |
| 2..(Factory generic voice) |
| EMERGENCY..PLEASE EVACUATE |
| Add on a |
| "EMERGENCY EXIT LOCATION ALARM" |
| Above door mounted |
| Or ceiling mounted.. |
| When activated, |
| 1 .Gives a "Verbal instruction" |
| Exit Here |
| 2..illuminates the frame of the door...and its surrounding |
| Methods..1-3 |
| 1..A Single Green horizontal and vertical cross is formed on the door but extending a extra 50cm beyond the frame for when the door is in a open position.. |
| again similar to a builders Laser... |
| 2..Two Green Lasers point down clear plastic/resin rods both sides of the door frame. |
| 3 illuminated by green led/smd's.. |
| ........ |
| The extra benefits of a visual and verbal alarm is it also assists the |
| 1 Visually Impaired, to identify/locate the direction of the exit by the sound of the "EXIT ALARM" |
| and Verbal instruction... |
| 2 Hearing Impaired after the strobe and pillow shaker has alerted them the Lasers give direction... |
| Add on...or save for updated new models. |
| 1..wifi notification to a dedicated mobile phone via internet.. |
| 2..snapshots in one minute intervals to mobile or emergency services to |
| Monitor or take action... |
| 3...ability to talk/interact and give instructions via the wifi connection. |
| ... |
| *The "LIFE" Alarm |
| Laser |
| Indicated/ identified |
| Fire |
| Exit |
| *Duel zone.. |
| Monitors above ceiling as well as below the ceiling space for smoke... |
| ................ |
| 2 |

| COMMERCIAL APPLICATION/MODEL |
| --- |
| Type 1 office |
| Type 2 motel |
| Type 3 movie theatres |
| These units are similar to the domestic unit but upgraded with |
| 1..Stronger Lasers to cover a greater distance.. |
| 2..Duel language or language recognition of in room guest/ guests... |
| (motel/cruise ship model) |

-continued

3..Duel zone...above and below the ceiling..
4..Add on..
Emergency Exit Alarms to give verbal
possible bedhead strobe and shaker for the sight and hearing Impaired
......
Proposed Protocols to change in industry..
Currently all airlines do a safety talk to identify the nearest exit...
Boat cruise staff also do a safety talk and identify the exits etc
Currently in movie theatres before each movie starts we are requested to turn off our mobile phones...
My vision is to get protocols/Duty of care changed so before every movie or performance there is a one or two second announcement with one shot of the lasers to highlight the exit doors ...
very short and simple but duty of care has been demonstrated by the theatre company.
the added benefit would be getting
Family first logo on the big screen
With a Voiceover saying something like
"Safety first
So First identify your nearest exit in case of a emergency...
Now enjoy the movie"
1 Laser identification of Fire exit and virtual corridors..
2 Dedicated exit alarm, which is not just for fire emergencies but any emergency that requires evacuation, be it earthquake, gas leaks etc....
2 customised or generic voice instructions/ directions
Including multi-language recognition
4 Single unit Dual Zone smoke detection above and below ceiling
5 Wi-Fi connectivity mobile alerts and interactive..
6..one minute interval snapshots for monitoring to dedicated mobile and or emergency services to monitor as well...
...
Different models for different applications and budgets.
Domestic
Commercial
Motel/accommodation/cruise ships
Movie theatres..
Concert venues..

Each of these additional features may be incorporated in the described forms of the invention.

Referring to FIGS. 3 to 8, Point of Exit Audible Alarm ("PEAA") 200 part of safety corridor arrangement 1 or 101 is disclosed, installed on exit door way 7. PEAA can equally be installed in a commercial situation, and doorway 107. Where exit doorway 7 or 107 are represented in FIGS. 1 and 2, is where PEAA 200 may be installed, as it is a particular useful form of the invention to have the full feature safety corridor arrangement 1, 101. PEAA 200 installed on exit doorway 7 includes bar 201, with pair of lasers 202 (202A and 202B in each pair), one or either end. Pair of speakers 203 likewise are installed at the area of lasers 202, at either end of bar 201, with pair of deflectors 204 created from a prism positioned directly below, with an angle of 45 degrees (refer FIG. 4) for deflection of the operated laser to create the safety corridor. Used are LENOXX IP X& waterproof Bluetooth speakers so that they can continue to work, even if wet due to sprinklers or hose use in response to a fire. A metal or other reflector deflector may be used instead. The number of lasers will depend on the application as while 4 total lasers is suitable for a domestic safety corridor arrangement 1, and 6 total lasers for a commercial application safety corridor arrangement 101. The lasers used are green lasers are used in the transport industry, and readily available. Each single green downward facing laser beam of pair of lasers 202, each having laser 202A and 202*b*, is located conveniently at the underside of bar 201, to direct the beam directly downwards. Due to the position of each of deflectors 204, directly below, and the 45 degree angle, this deflects the beam form lasers 202A, splitting the laser in the 45 degree angles to give an impression of the sides of a corridor. For a person heading toward exit doorway 7, the deflected laser beams, one each from either side of bar 201, forms a fanned horizontal beam of laser, which defines the floor or slightly above the floor of the corridor to assist the person to find the way to the exit and safety. The person when moving in the correct direction will be able to see the lasers on their hands and or feet which is a further indication that they are moving in the correct direction, towards the doorway. The lasers and the bright safety corridor created will be visible as a guide to safety, even in the dark or thick smoke, from both floor level and if able to stand. It is not always possible to walk in a fire, due to thick acrid smoke or extreme heat and so a person may be crawling and keeping low to avoid the smoke and heat. It is a well-known technique in fire safety education to keep low when trying to escape a fire, however, this makes it very difficult to see where to go. This is opposed to standard fire exits that only provide the single lit exit sign. In some situations, such as a cinema or on a plane, a row of lights is used to assist finding the way to your seat in low light situations. While the exit light and the row of lights are useful, these provide a very limited safety compared to the whole safety corridor created and visible at all levels from floor to the top of the door. Even if a person is forced to crawl below thick smoke, or in very low visibility, or approaching perpendicular to the safety corridor the person can see and understand where they need to go to follow the safety corridor to the exit. Multiple paths from one exit to another may be needed to be travelled to leave the building and these can be followed as ordinary corridors, door to door, but are safety corridors of lasers visible even in low or no visibility. The fanning out laser-light from pair of lasers 202A deflected on pair of deflectors 204 that creates the sides of the safety corridor also can be seen on the hands and feet of the person of the person as they crawl or walk toward exit doorway 7. In this way the person is reassured that they are moving the correct way, towards exit doorway 7, even if they cannot see it yet. If the person were to move in the wrong direction the laser light would not fall on their hands or feet.

Each of pair lasers 202, also includes 202B which is directed back on exit with a 90 degree spread to doorway 7 to brightly illuminate the vertical sides and the doorway in general. In this way the lasers illuminate the doorway clearly and brightly, and also creates the corridor to assist people to get to the doorway, a significant improvement in safety.

Pair of Speakers 203 are programmed to give a loud and clear audible warning. The audible warning alone should be sufficient to direct a person who may not have vision to the doorway. Many people are in some way visually impaired and so this audible guide is useful to assist people to find their way to the safety corridor and to the doorway. So while the exit can be located by sound alone, it also is yet another layer of safety to assist people to find their way as quickly as they can. The speaker system can be used to say "Exit here, exit here" for example, or some other appropriate message to assist people to find the exit doorway. For domestic situations, and where children or the elderly may require additional reassurance the speakers may be used to give a loud message as spoken by a familiar voice, such as a family member so that the person is reassured and will follow the command. It is easy for people to be very frightened in a fire and so the more reassurance that can be give to minimise panic and help the family get out safely the better. Alternatively, a standard calm and confident voice can be used in a commercial setting to guide people to safety, or if preferred in a domestic sitting.

Each of the light and sound aspects of the invention could be used individually. It is most beneficial, to use all aspects in combination.

LED light strip 205 on the underside of bar 201 is a strip of high intensity lighting to fully illuminate the doorway.

As described in the domestic arrangement there are two pairs of lasers 202A and 202B to illuminate the doorway and create the corridor. Although not shown when PEAA 200 is used in a commercial arrangement a further pair of lasers is included, similar to 202B but these direct a laser straight up to the ceiling so that in a larger building the location of the exit doorway can be seen from a greater distance and is further highlighted. Also, in commercial or industrial setting it is possible the location of the EXIT itself may be obscured by fallen shelves or pallets of stock. The laser light up to the ceiling shows where the exit is even if the exit itself is obscured as a further level of safety in directing people to safety.

EXIT sign 206 is illuminated in the usual fashion about PEAA 200 to highlight that doorway 7, 107 is a fire exit in times of emergency. Lasers 202B highlights the outline of doorway 7, 107 below, and commercially doorway 107 has its location further highlighted by the further pair of lasers direct to the ceiling.

In order to run a safety test 208 test button is included to the side to turn on and off. A control panel may be included to assist in the control and communication of the safety system. Alerting channel systems are known, for example the SMS solution is used in Australia (similar systems are used elsewhere, for example, in USA CMAS wireless Emergency Alerts, or New Zealand's Emergency Mobile Alert using a public warning cell broadcast "CB" system) to forward emergency alert information. The information can be sent through the mobile phone networks using SMS to send text to any apparatus configured to receive the text. Similar systems have been used to provide visual rather than aural phone messages for some time. Use of the SMS system is convenient as the alert can be sent straight to a mobile phone or any other compatible device. In the case of an emergency different tones can be used to alert to the emergency, and visual text information provided and displayed. The announcement and display information for use in the invention may be sent direct from the Alerting Channel to the device and displayed visually, and sounds announcing the alert made and communicated to other parts of the system. Preferably, the invention is connected to the local alert system so that when an emergency is detected the information can be communicated to other parts of the system and automatically to the emergency services. Further, messages from the emergency services are relayed directly to the device for communication to people in or around the building. As an example, an emergency alert may be issued by the government to give a recorded voice message to phones in a certain geographical region, this message may also be announced though use of the system and or displayed on the LED display. These may relate to danger or fire, but could relate to any other alert, such as the need to restrict water use or for poor air quality, making use the useful LED displays and the sound alerts shared about the building. Most preferably, however, the alerts are used in the case of an emergency fire, and play a crucial part in assisting to get good safety information to the people in the building as quickly as possible so that they get to safety.

Figure 3:
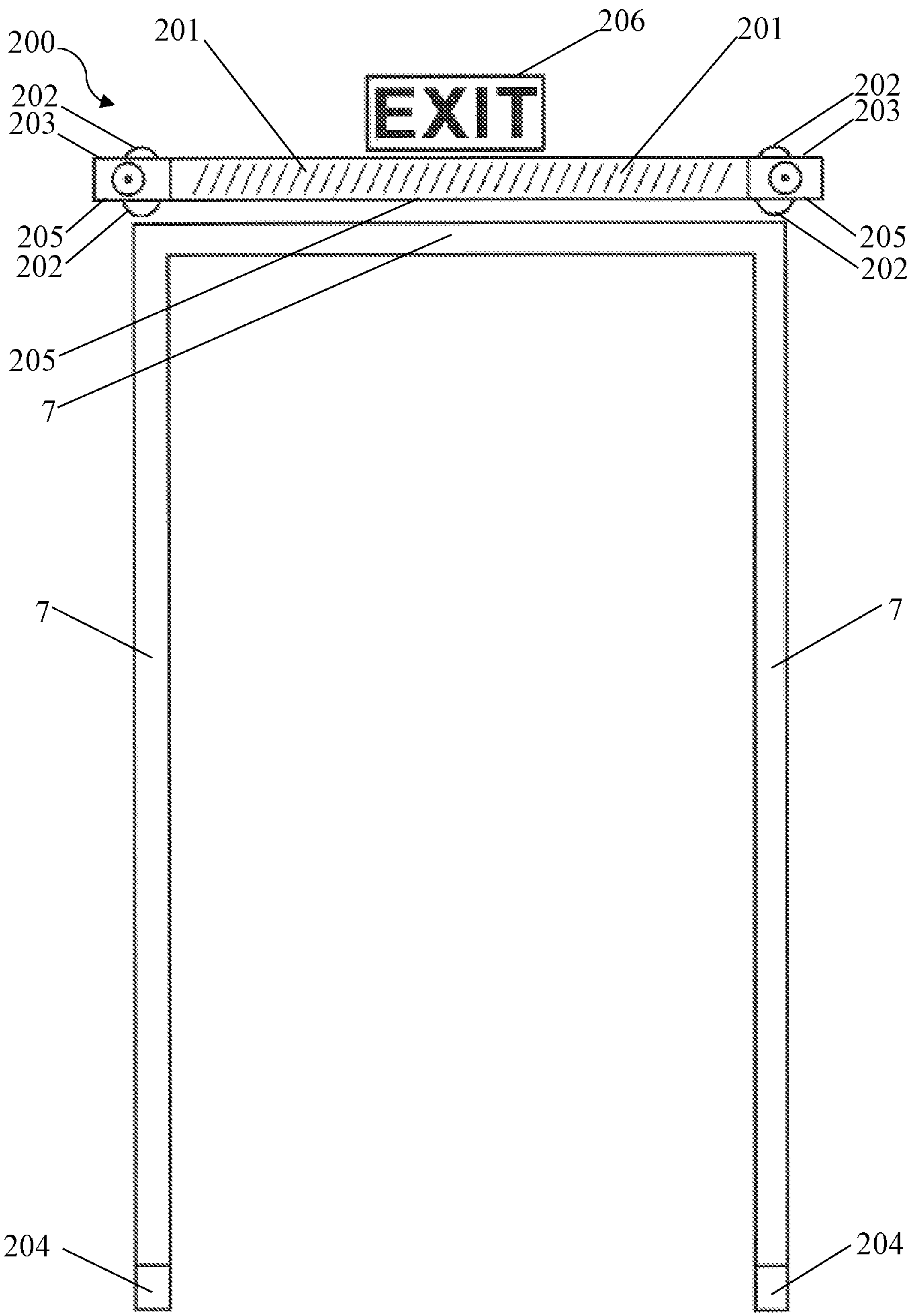
FIG. 3 is a front view of a point of exit audible alarm, used as part of the safety corridor arrangement according to the first preferred embodiment of FIG. 1 if used in a commercial setting, or second preferred embodiment of FIG. 2 if used in a domestic setting.
Figure 4:
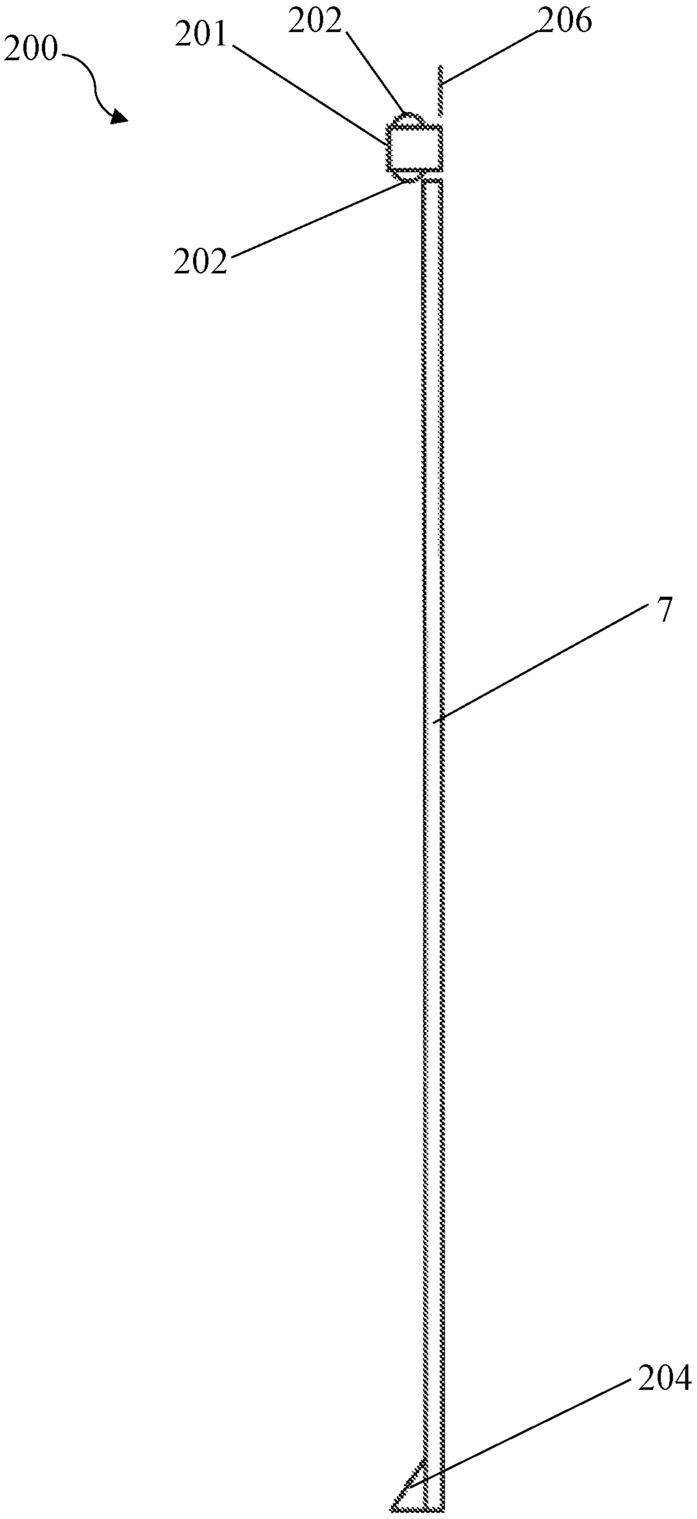
FIG. 4 is a side view of the point of exit audible alarm of FIG. 3.
Figure 5:
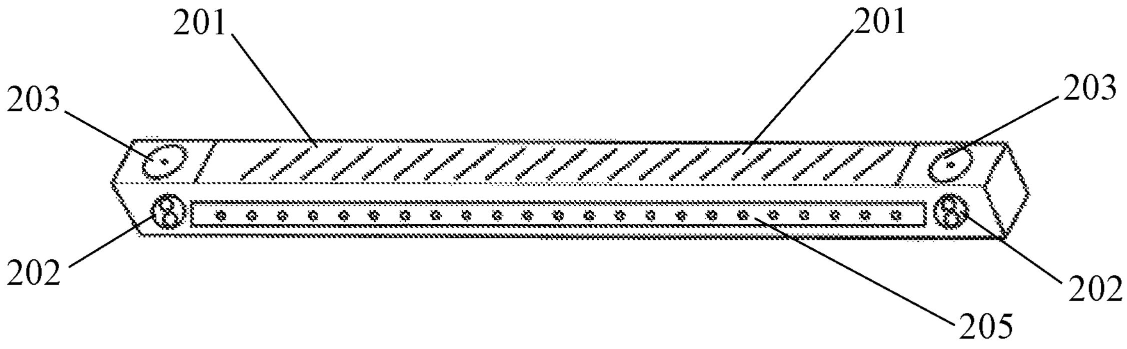
FIG. 5 is a perspective view of the point of exit audible alarm of FIG. 3 or 4, with the door frame omitted for ease of illustration.
Figure 6:
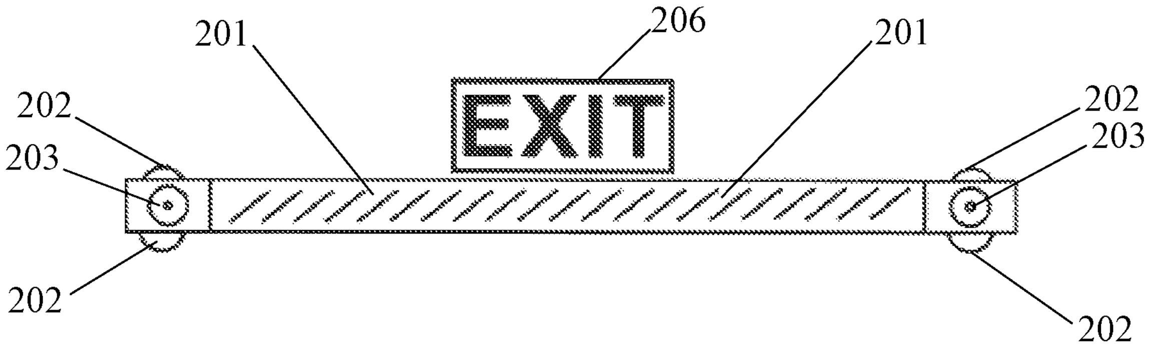
FIG. 6 is a front view of the point of exit audible alarm of FIG. 3 or 4, with the door frame omitted for ease of illustration.
Figure 7:
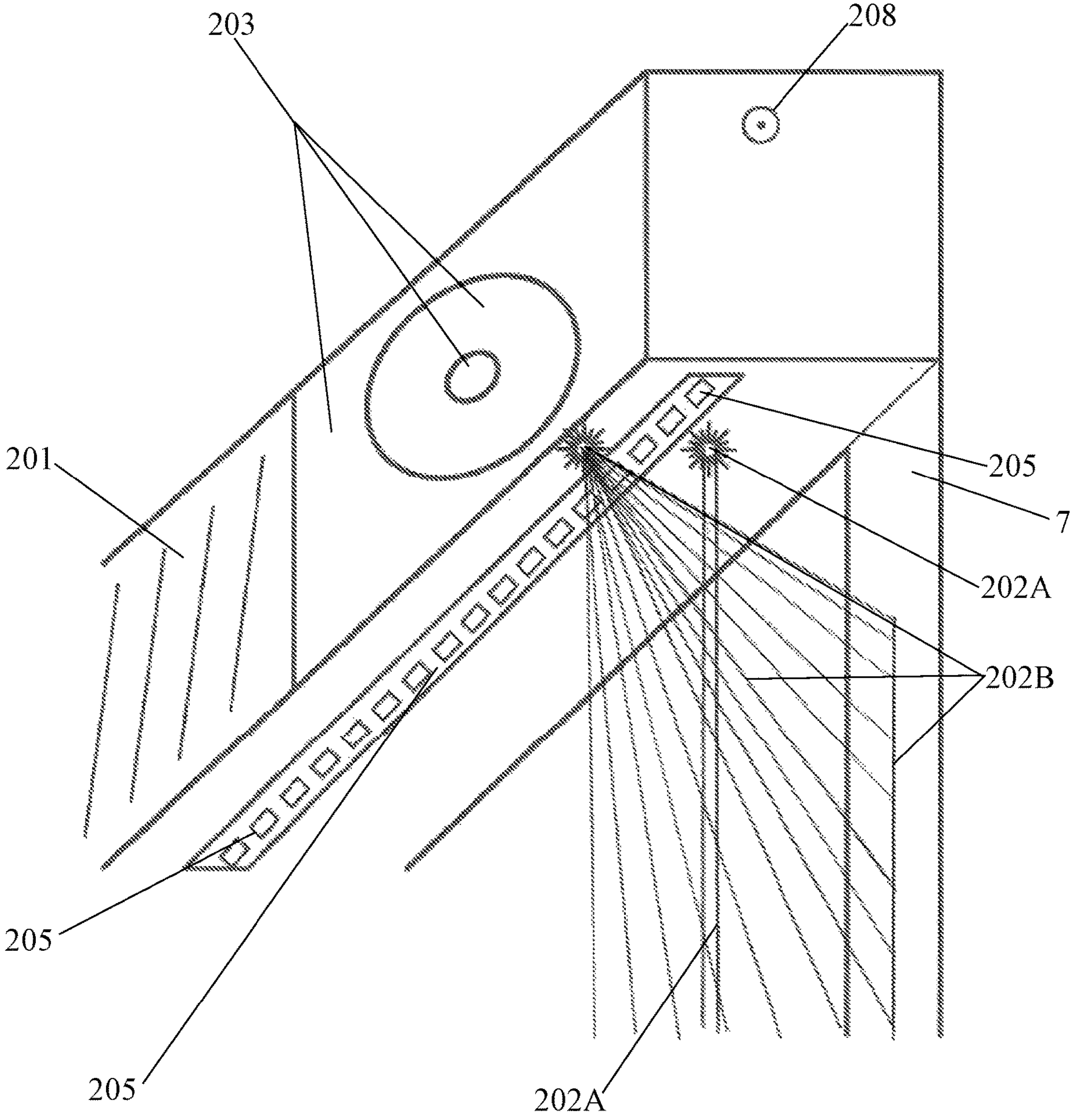
FIG. 7 is a detailed perspective view of the point of exit audible alarm of FIGS. 3 to 6, illustrating the speakers in particular.

As can be seen in particular in FIG. 3, bar 201 of PEAA 200 is of a form similar to TV sound bar, installed horizontally about doorway 7. The installation is convenient as it does not in any way interfere with the use of the doorway, is out of the way, and readily can be installed, wired to the house power supply and connected either wired or wirelessly to the house network. The wireless connection may be to other parts of the safety corridor arrangement which in turn connected to the network, or it may connect to the network directly. A display is included across the front of bar 201 to display information. The display is a standard Light Emitting Diode ("LED") panel such as the Compucare (Trade Mark) single colour scrolling LED with control panel which has been adapted through use of a microprocessor and WIFI link to be controlled remotely. Wired power with a back up battery supply is preferred through all parts of the system. The clear text and symbol displays linked to the control panel, and the Alert system mentioned above enables clear safety announcements to be displayed. Preferably, a large number of LEDs are used to enable clear text, and longer messages. These displays include FIRE EXIT HERE either scrolling or constantly displayed, and can also say any suitable message to direct people to the emergency. There may be a constant message during ordinary use, or it may be blank until the emergency. Different messages can display depending on the emergency, and this may be controlled locally at the PEAA or through control of the other parts of the safety corridor arrangement.

Figure 8:
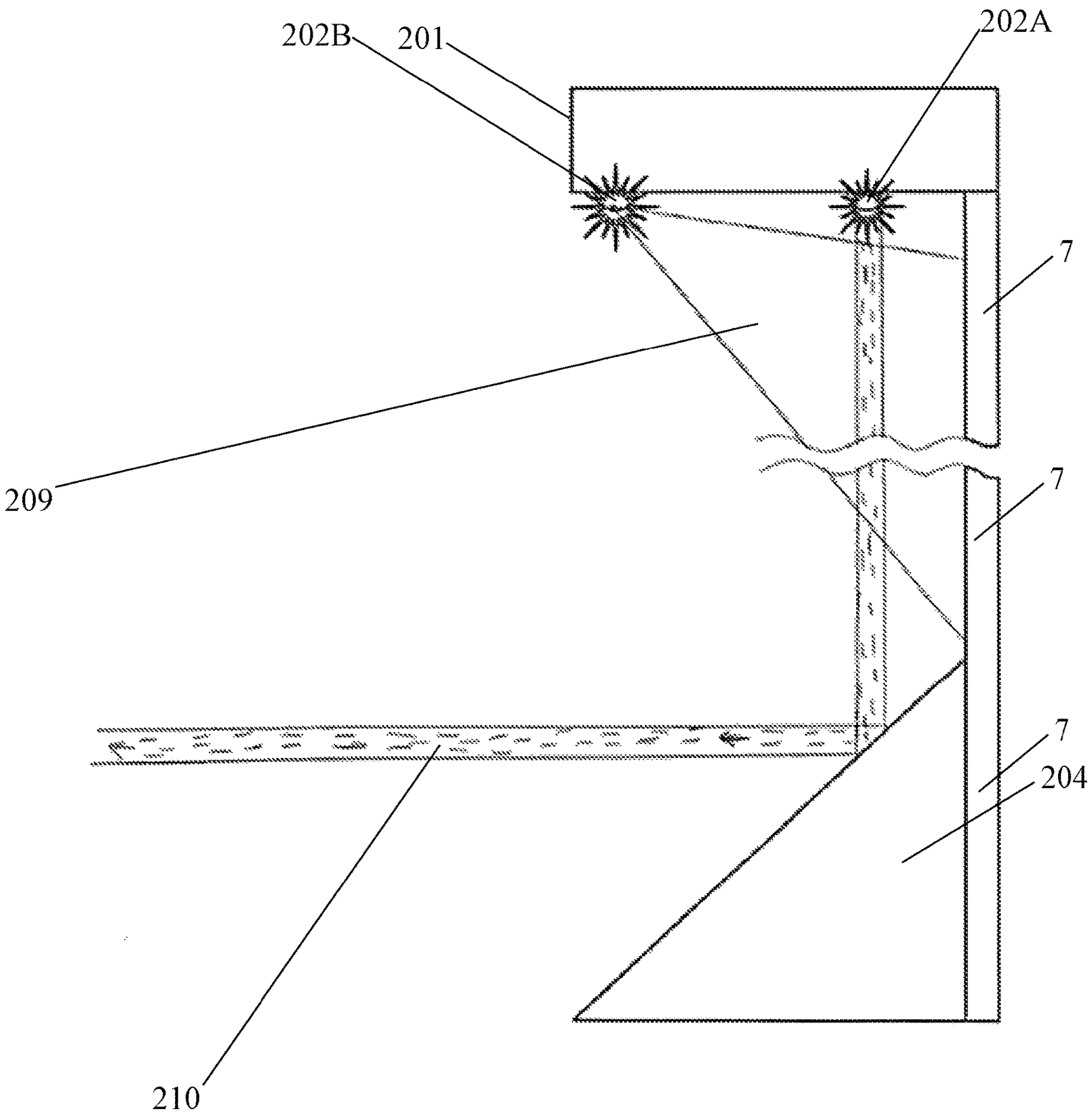
FIG. 8 is a side view of the point of exit audible alarm of FIGS. 3 to 7, illustrating the laser system.

Referring to FIG. 8, the angles created by the lasers is particularly illustrated, below 201, laser 202A and 202B relative to exit doorway 7. The side view shows the deflection by deflector 204 of 202A as it beams vertically down, back along the corridor, labelled 210. Laser 202B fanning out laser 209 beaming back to doorway 7. Shown as 210 beam is a direct beam but may be a direct beam along the ground or may be fanned out to add to the wall created.

The invention is a significant invention, with many uses, domestically and commercially to improve safely. It is likely that the invention will rapidly be adopted as a clever new safety means to assist people to safely get out of buildings in an emergency.

INDUSTRIAL APPLICABILITY

The invention in its many aspects, may be manufactured industrially and installed for use domestically or commercially. It is anticipated that a quality safety professional will be used to sell, supply and install the safety equipment subject to the invention.

It will be apparent to a person skilled in the art that changes may be made to the embodiments disclosed herein without departing from the spirit and scope of the invention in its various aspects.

REFERENCE SIGNS LIST:

| | | | |
|---|---|---|---|
| 1 | Safety corridor arrangement | 101 | Safety corridor arrangement |
| 5 | Room | 105 | Room |
| 7 | Exit doorway | 107 | Exit doorway |
| 10 | Laser operation unit | 110 | Laser operation unit |
| 12 | Ceiling smoke detector | 112 | Ceiling smoke detector |
| 14 | LED Notification panel | 114 | LED Notification panel |
| 16 | Speakers and alarms | 116 | Speakers and alarms |
| 18 | Laser lights | 118 | Laser lights |
| 20 | WIFI/Bluetooth Connector | 120 | WIFI/Bluetooth Connector |
| 22 | Safety corridor | 122 | Safety corridor |
| 200 | Point of Exit Audible Alarm ("PEAA") | 208 | Test button |
| 201 | Bar | 209 | Fanned out laser beam |
| 202 | Pair of lasers each with 202A and 202B | 210 | Deflected laser beam |
| 203 | Speakers | | |
| 204 | Deflectors | | |
| 205 | Strip of high intensity LEDs | | |
| 206 | EXIT sign | | |

The claims defining the invention are as follows:

1. A virtual safety corridor system for use in emergency situations, the virtual safety corridor system comprising:

an activation system comprising one or more detectors;

a laser control unit in communication with the activation system;

the laser control unit comprising one or more first laser units, the one or more first laser units configured to project a pair of virtual vertical walls, the virtual vertical walls forming a virtual safety corridor projected toward an emergency exit to guide or direct a person to the emergency exit;

an exit arrangement system, the exit arrangement system positioned above the emergency exit and comprising a bar and a plurality of second laser units, the bar being an elongated housing and the plurality of second laser units mounted to the bar;

a first of the plurality of second laser units substantially aligned with a first of the pair of virtual vertical walls and positioned above a first deflector, and a second of the plurality of second laser units aligned with a second of the pair of virtual vertical walls and positioned above a second deflector;

the first deflector configured to convert a substantially vertical laser beam projected from the first of the plurality of the second laser units toward the first deflector into a first substantially horizontal laser beam, and the second deflector configured to convert a substantially vertical laser beam projected from the second of the plurality of the second laser units toward the second deflector into a second substantially horizontal laser beam, the first and second substantially horizontal laser beams each directed away from the emergency exit to create a virtual floor extending from the emergency exit, the virtual floor being substantially perpendicular to the emergency exit and located above and substantially parallel to a floor;

a third and fourth of the plurality of second laser units each configured to project vertically fanned laser beams toward a frame of the emergency exit such that the vertically fanned laser beams illuminate the frame, wherein, because the pair of substantially horizontal laser beams is projected away from the emergency exit, the pair of substantially horizontal laser beams are projected onto the front of the person when the person is facing the emergency exit, thereby providing an indication that the person is traveling toward the emergency exit.

2. The virtual safety corridor system of claim 1, wherein the one or more detectors are selected from the group consisting of smoke detectors, chemical detectors, dust detectors, motion detectors, temperature detectors, oxygen detectors, sound detectors, moisture detectors, and combinations thereof.

3. The virtual safety corridor system of claim 1, wherein the laser control unit is in wireless communication with the activation system.

4. The virtual safety corridor system of claim 1, wherein a plurality of virtual safety corridors are provided and configured to direct the person through a plurality of emergency exits.

5. The virtual safety corridor system of claim 1, wherein the laser control unit further comprises one or more visual, audible, or physical alerts and the one or more visual, audible, or physical alerts is selected from the group consisting of audible alarm, visual display, flashing light, light, siren, shaking device, vibration, and combinations thereof.

6. The virtual safety corridor system of claim 1, further comprising a plurality of speakers in communication with the activation system and the plurality of speakers are waterproof speakers.

7. The virtual safety corridor system of claim 1, wherein the exit arrangement further comprises a notification panel located on a front face of the bar and a light strip located on a lower face of the bar, the notification panel configured to visually display emergency messages, and the light strip configured to illuminate the emergency exit.

8. The virtual safety corridor system of claim 1, wherein the exit arrangement system further comprises one or more speakers mounted to the bar.

9. The virtual safety corridor system of claim 1, wherein the exit arrangement system further comprises one or more lights on an underside of bar to illuminate the emergency exit.

10. The virtual safety corridor system of claim 1, wherein the exit arrangement system further comprises a display on a front side of the bar to display an alert.

11. The virtual safety corridor system of claim 1, wherein the laser control unit further comprises one or more notification panels to display an alert.

* * * * *